E. SIEGEL.
SHOCK ABSORBER.
APPLICATION FILED JULY 17, 1918.
1,313,643.
Patented Aug. 19, 1919.
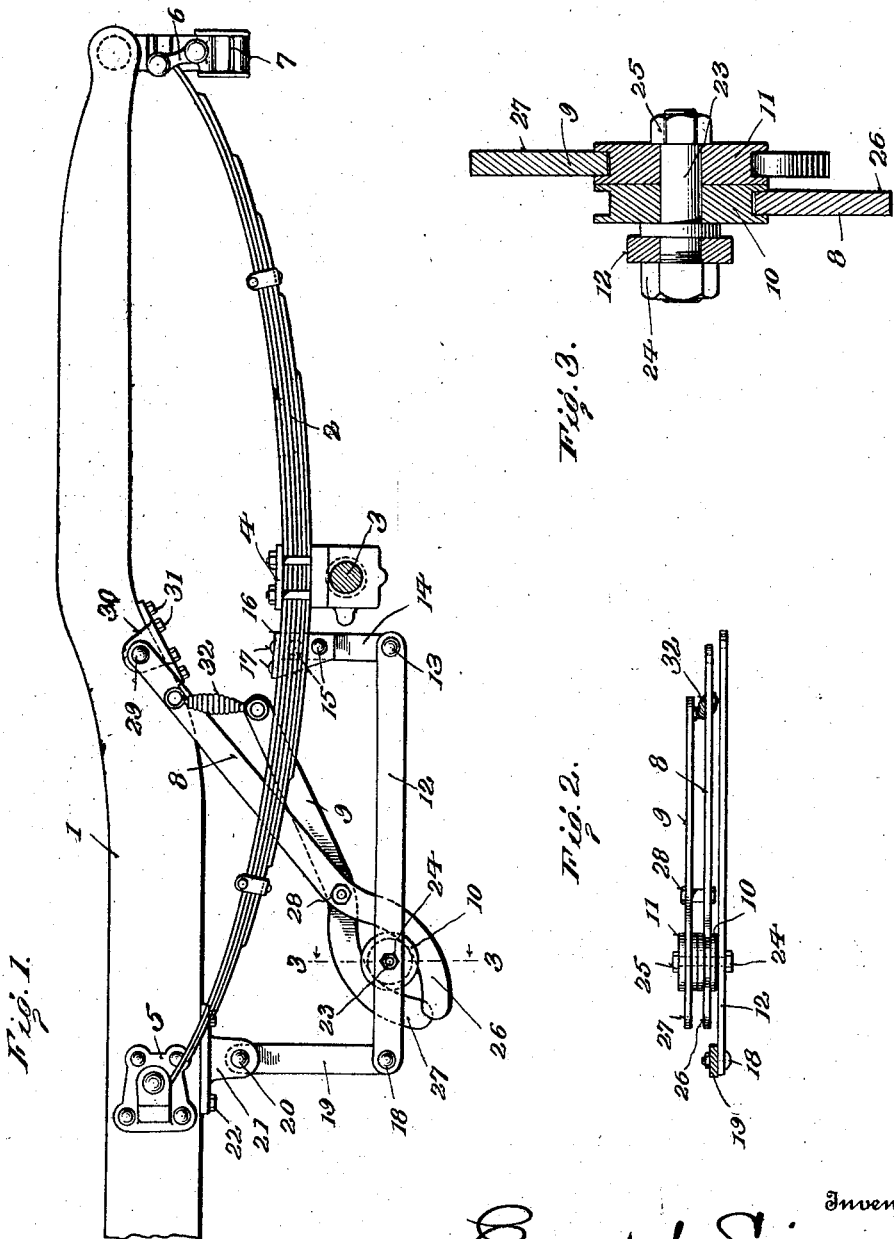
Witness
Edwin C. Bradford
Inventor
Ernest Siegel,
By Wm E. Dye.
Attorney

UNITED STATES PATENT OFFICE.

ERNEST SIEGEL, OF NEW YORK, N. Y., ASSIGNOR OF ONE-HALF TO MICHAEL COOPER, OF NEW YORK, N. Y.

SHOCK-ABSORBER.

1,313,643.  Specification of Letters Patent.  Patented Aug. 19, 1919.

Application filed July 17, 1918. Serial No. 245,285.

*To all whom it may concern:*

Be it known that I, ERNEST SIEGEL, a citizen of the United States, residing at New York, in the county of New York and State of New York, have invented certain new and useful Improvements in Shock-Absorbers; and I do hereby declare the following to be a full, clear, and exact description of the invention, such as will enable others skilled in the art to which it appertains to make and use the same.

My invention relates to certain new and useful improvements in shock absorbers for vehicles, and contemplates more especially an improved construction of the form set forth in United States Letters Patent No. 1,264,694, granted to me on the 30th day of April, 1918.

An object of the present invention is the production of a shock absorbing device which can be readily applied to the chassis and spring of an automobile for effectively reducing the shock, and at the same time be sufficiently concealed beneath the body of the car so as not to detract from the carefully designed contour and lines thereof.

Another object of this invention is to produce a novel form of shock absorber of the type referred to, in which the coöperating pivoted levers are interconnected with a swinging bar movably supported in brackets depending from the chassis and spring of the car.

With these and other objects in view the invention further consists in the combination and arrangement of the several parts hereinafter described and pointed out in the appended claims.

In the drawings which show an embodiment of my improved shock absorbing device, and in which corresponding reference characters designate similar parts:

Figure 1 is a fragmentary view in elevation of an automobile chassis and spring, showing my improved shock absorbing device applied thereto.

Fig. 2 is a top plan view of the shock absorbing device detached, and

Fig. 3 is a detail sectional view on the line 3—3 of Fig. 1.

The present invention has been primarily designed for attachment to the under side of the frame or chassis of a motor car. It is interposed between the spring and chassis and arranged upon the inwardly extending portion of said spring, thereby relieving the car of an unsightly and clumsy appearance caused by the present type of overhanging and protruding shock absorbing devices.

Referring to the drawings, the frame or chassis 1 of the vehicle is shown supported by the usual leaf spring 2 secured to the axle 3 by means of the clamp 4. One end of the spring 2 is attached to the frame 1 by means of a bracket support 5 and the other end may be supported in a shackle or link connection 6 in turn connected to another spring 7 extending laterally across the car. This latter end of the spring 2 may however, be attached to the frame 1, and I do not limit myself to the exact form of connection shown.

The shock absorbing device comprises coöperating levers 8 and 9 pivotally positioned around grooved wheels or rollers 10 and 11 carried by a suspended bar or link 12 movably connected to the leaf spring 2 and frame 1.

The bar or link 12 is pivotally attached at 13 to the end of a depending arm 14 rigidly secured by means of rivets 15 to an angle strap 16 which latter is in turn firmly attached to the leaf spring 2, by rivets or other suitable means 17.

The opposite end of the bar 12 is loosely connected at 18 to the lower end of a link 19. The link 19 is pivotally attached at 20 in a supporting bracket 21 secured to the under side of the frame 1 by means of bolts 22. By this construction it will be seen that the link or bar 12 is swingingly suspended between the frame 1 and the leaf spring 2 so as to transmit the relative movement of the said frame and spring 2 to the shock absorbing means.

The grooved wheels or rollers 10 and 11 are supported from the bar 12 on a projection or stub shaft 23 suitably held in position by means of nuts 24 and 25 respectively, threaded upon the opposite ends of said shaft.

Resting within the grooves of the rollers 10 and 11 and frictionally coöperating therewith are the lower curved ends 26 and 27 of the levers 8 and 9 hereinbefore mentioned. As shown, the lower curved portion 26 is adapted to embrace the frictional surface of the groove in the roller 10, and the lower curved portion 27 is arranged to contact with the frictional surface of the groove in the roller 11.

The pivotal connection of the levers 8 and 9 is indicated by the numeral 28 and is preferably located at or about the beginning of the curved ends 26 and 27. The lever 8 is shown as being of a greater length than the lever 9, and is pivotally connected at 29 in a bracket 30 secured to the frame 1 by means of bolts 31. Interposed between the end of the lever 9 and a point near the end of lever 8 is a contractile spring 32 of a predetermined strength dependent upon the weight of the car and load to be carried.

The operation of the foregoing structure follows: Upon the subjecting of the vehicle to a shock caused by the irregularity or unevenness of the road, the frame or chassis 1 supporting the car will descend placing the leaf spring 2 under tension in the usual manner.

The shock absorbing device is carried downwardly with the frame 1, the link or bar 12 swinging about the pivot 13. The loose connection or link 19 permits of this action. In the descending of the device a relative movement is imparted to levers 8 and 9, the lower ends 26 and 27 of which move in the grooves of the rollers 10 and 11.

Upon the ascension of the frame or chassis due to the rebound, the shock is absorbed by reason of the bar 12 swinging upwardly in the reverse direction due to its connection with the frame 1, and causing the roller or wheel 11 to exert a direct pressure upon the under side of the curved end 27 of lever 9 and depress the opposite end thereof, placing the contractile spring 32 under tension. The degree of tension imparted to the spring 32 relatively retards the upward movement of the frame or chassis 1 and thereby relieves the vehicle of sudden shocks and jars to which otherwise it would be subjected. The location of the shock absorbing means also serves to more uniformly prevent the sudden elevating of the body of the car or rebounding because of the weight being better distributed over the same.

From the foregoing it will be obvious that I have produced an effective shock absorbing means possessing advantages of simplicity in attaching the same to a motor car, and certain economic merits in its design and construction.

I claim:

1. A shock absorbing device of the class described including in combination a vehicle frame and supporting spring, of a bar loosely secured to said frame and spring, a projection upon said bar, a pair of levers fulcrumed upon each other, and adapted to bear upon opposite sides of the said projection, a contractile spring connecting the ends of said levers, and means for attaching one of said levers to the frame of the vehicle.

2. A shock absorbing device of the class described including in combination a vehicle frame and supporting spring, of a bar swingingly connected between said frame and spring and longitudinally positioned beneath the latter, a projection upon said bar, a pair of levers fulcrumed upon each other, and adapted to bear upon opposite sides of the said projection, a contractile spring connecting the ends of said levers, and means for attaching one of said levers to the frame of the vehicle.

3. A shock absorber of the class described including in combination a vehicle frame and supporting spring, a bar pivotally connected to said spring, a link loosely connected to said bar and the frame of the vehicle, a projection upon said bar, a pair of levers fulcrumed upon each other and adapted to bear upon opposite sides of the said projection, a contractile spring connecting the ends of said levers, and means for attaching one of said levers to the frame of the vehicle.

4. A shock absorber of the class described including in combination a vehicle frame and supporting spring, a bracket support secured to said spring, a bar pivotally connected to said bracket support beneath the spring, a link loosely connected to said bar and the frame of the vehicle, a pair of friction rollers carried by said bar, a pair of levers fulcrumed upon each other and adapted to bear upon opposite sides of their respective rollers aforesaid, a contractile spring connecting the ends of said levers, and means for attaching one of said levers to the frame of the vehicle.

In testimony whereof I affix my signature, in presence of two subscribing witnesses.

ERNEST SIEGEL.

Witnesses:
  SYDNEY JACOBS,
  HYMAN BROWN.

Copies of this patent may be obtained for five cents each, by addressing the "Commissioner of Patents, Washington, D. C."